United States Patent

[11] 3,577,617

| [72] | Inventor | William Owen McKenzie Jones<br>Hurle, Berkshire, England |
|------|----------|----------------------------------------------------------|
| [21] | Appl. No. | 750,408 |
| [22] | Filed | July 3, 1968 |
| [45] | Patented | May 4, 1971 |
| [32] | Priority | July 12, 1967 |
| [33] | | Great Britain |
| [31] | | 32032/67 |

[54] MACHINE TOOLS
10 Claims, 7 Drawing Figs.

[52] U.S. Cl. .................................................. 29/54,
29/26, 29/568
[51] Int. Cl. ........................................................ B23b 29/24
[50] Field of Search ........................................... 29/54, 568,
26; 211/1.5

[56] References Cited
UNITED STATES PATENTS

| 3,186,085 | 6/1967 | Coate | 29/568 |
| 3,259,958 | 7/1966 | Lemelson | 29/26 |
| 3,359,761 | 11/1967 | Sadier | 29/568X |
| 3,431,633 | 3/1969 | Fulks | 29/568 |

*Primary Examiner*—Francis S. Husar
*Assistant Examiner*—Z. R. Bilinsky
*Attorney*—Davis, Lucas, Brower & Brugman

ABSTRACT: The invention relates to a tool-changing mechanism for use with machine tools and in particular with lathes. The mechanism comprises a conveyor which can carry an unspecified number of tools sequentially to a tool-receiving station at which they are located in order to perform a cutting operation. The tools are intended normally to be preset away from the machine tool and in this condition can be mounted on the conveyor ready for a sequence of machining operations.

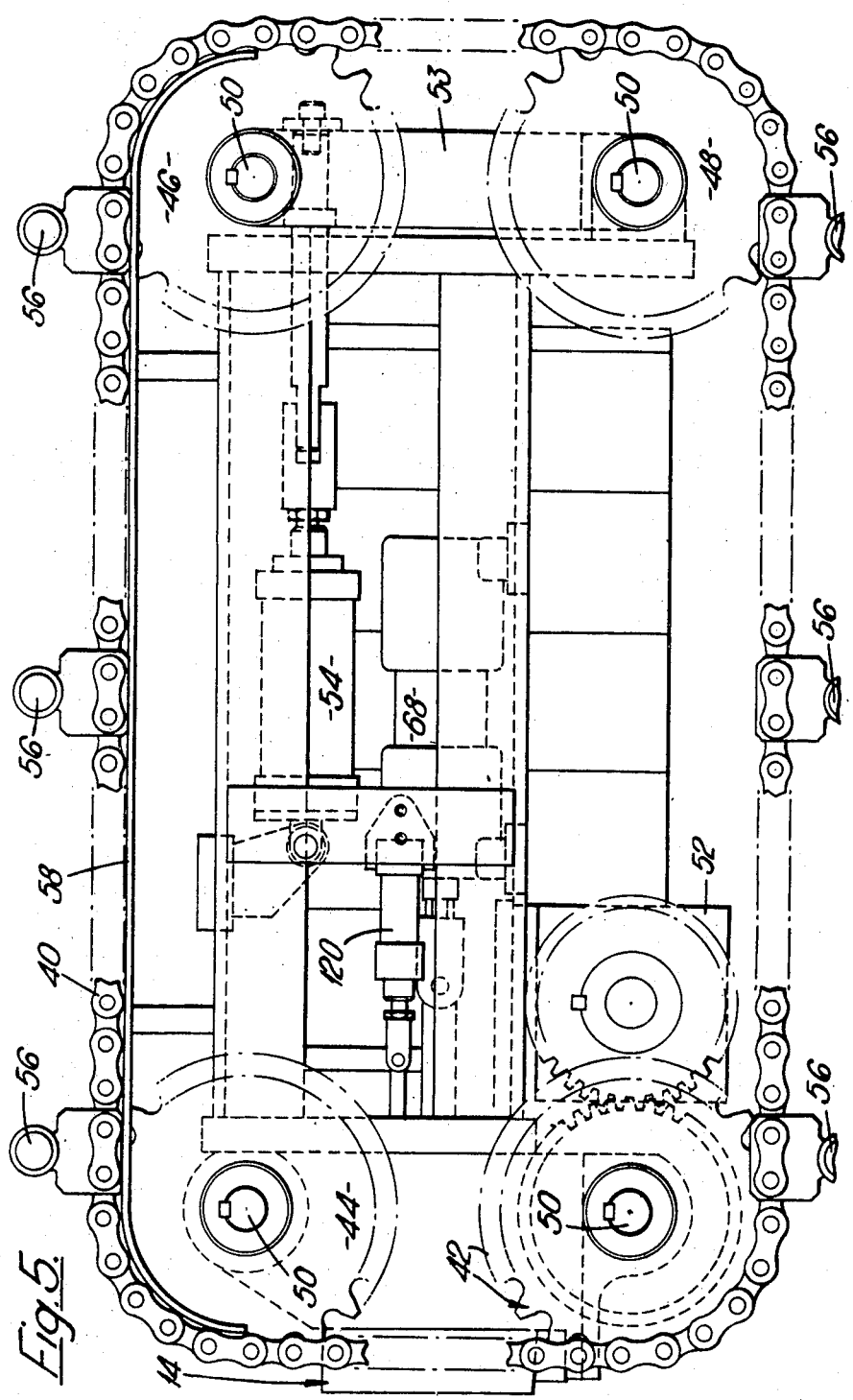

3,577,617

MACHINE TOOLS

This invention relates to machine tools and in particular to capstan and turret lathes.

As parts which are turned on lathes, and in particular automatic lathes, become more and more complex, machining sequences have to be very carefully planned taking into account the limitations imposed by having only a limited number of turret or capstan tool stations in most cases, six. Sometimes, this limitation results in a component having to be machined in two stages, thus adding considerably to its cost.

In accordance with the invention a lathe has a tool-receiving station normally at the tailstock, at which tools or tool holders can be held in a predetermined position relative to the centerline of the spindle, and means are provided sequentially to feed tools or toolholders to the tool-receiving station.

In a preferred embodiment, the tools are locked in a predetermined position in a toolholder, conveniently one having a dovetail member, which is engaged in a corresponding dovetail at the tool-receiving station against a retractable stop in which position the toolholder can be clamped. When the machining operation is complete, the stop is retracted and the toolholder is withdrawn, the stop replaced in its operational position, and the next tool is fed to the station to be located and clamped for the following machining operation.

The tools may be preset in toolholders relative to reference planes whose position relative to centerline and a place along the centerline of the machine tool is known when the holder is in the position at the tool-receiving station on a jig remote from the machine tool and then mounted for operation on the tailstock, the presence of only a single machining station on the tailstock, greatly simplifies the presetting of the tools and increases the accuracy obtainable.

The toolholders may be mounted on an endless chain or conveyor means which is arranged to feed them sequentially to the tool-receiving station and to remove them at the end of an operation. Thus, any number of tools can be mounted on the conveyor means either by reducing the travel of the conveyor at the end of each operation or by adjusting the length of the conveyor for the number of tools to be employed e.g. 10 tool stations.

The invention will now be further described by way of example with reference to the accompanying drawings in which:

FIG. 5 is a side elevation of the tailstock assembly.

The tailstock assembly generally indicated at 10 (FIG. 1) comprises a rigid frame or body 12 having a tool-receiving station 14 at one end of it and a tool-carrying conveyor 16 which transports plural spaced tool holders 18 to and from the tool-receiving station 14.

Figure 2:
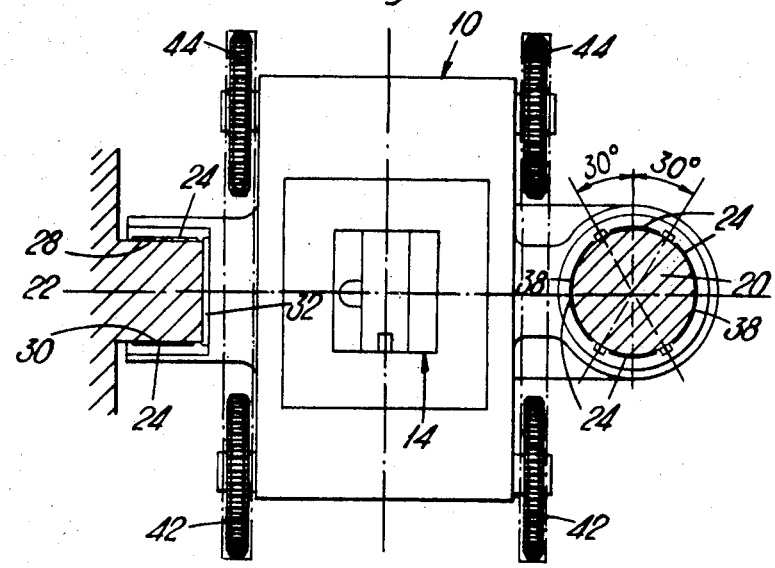
FIG. 2 is a diagrammatic end elevation of the support for the tailstock assembly.

The tailstock assembly is mounted between two supports 20, 22 (FIG. 2) by means of hydrostatic bearings 24, (FIG. 2a) to which pressure fluid is supplied through ducts 26. One of the supports 20 is of a circular cross section and acts to position the assembly in both the vertical and horizontal planes, whilst the other support 22, which is of square cross section, locates the assembly angularly by means of its upper and lower faces 28, 30. The inside face 32 of the square support is not used for location of the assembly and has no contact with the assembly.

Figure 2B:
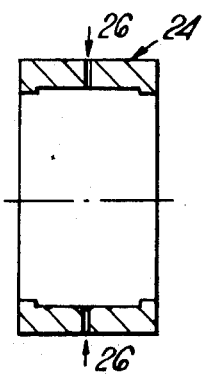
FIGS. 2a and 2b are diagrammatic cross sections of bearing means employed in the tailstock assembly.
Figure 2A:
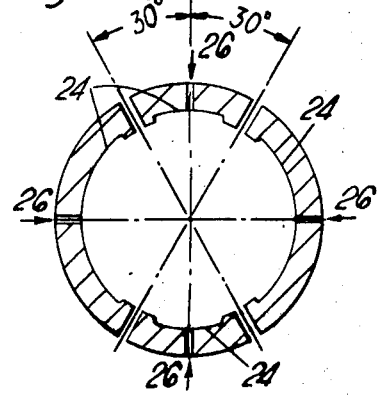

The circular bearing is divided into four sectors by two lines at 30° to the vertical so that the upper and lower sectors subtend an angle of 60° and bear half the vertical thrust and/or weight force of the assembly the two side sectors 38 which subtend 120° bear all the lateral forces alone and only a comparatively small component of the vertical forces (see FIG. 2b). The use of the hydrostatic bearings enables the assembly to be aligned to very close tolerances and by virtue of its small coefficient of friction the problem of wear to the slides is reduced to a minimum and the tolerances are maintained for prolonged periods.

The two supports 20, 22 are located in the same plane as the workpiece in order to obtain the most accurate location of the conveyor, in other words the centerline of the workpiece is in the same plane as that of the circular support 20, and the line passing through the center of the square support 22 as shown in FIG. 2.

The tool-carrying conveyor 16 comprises two endless chains 40 one at each side each passing round four sprockets 42, 44, 46, 48 keyed to axles 50 mounted at the four corners of the body 12. One of the pairs of sprockets 42 is geared to a driving motor 52 and another pair 46 is mounted on a lever 53 which is pivoted about the axle 50 of the lower pair of sprockets 44, and biased outwardly by a pneumatic ram 54 in order to maintain a correct tension in the chains (see FIG. 5).

Figure 1:
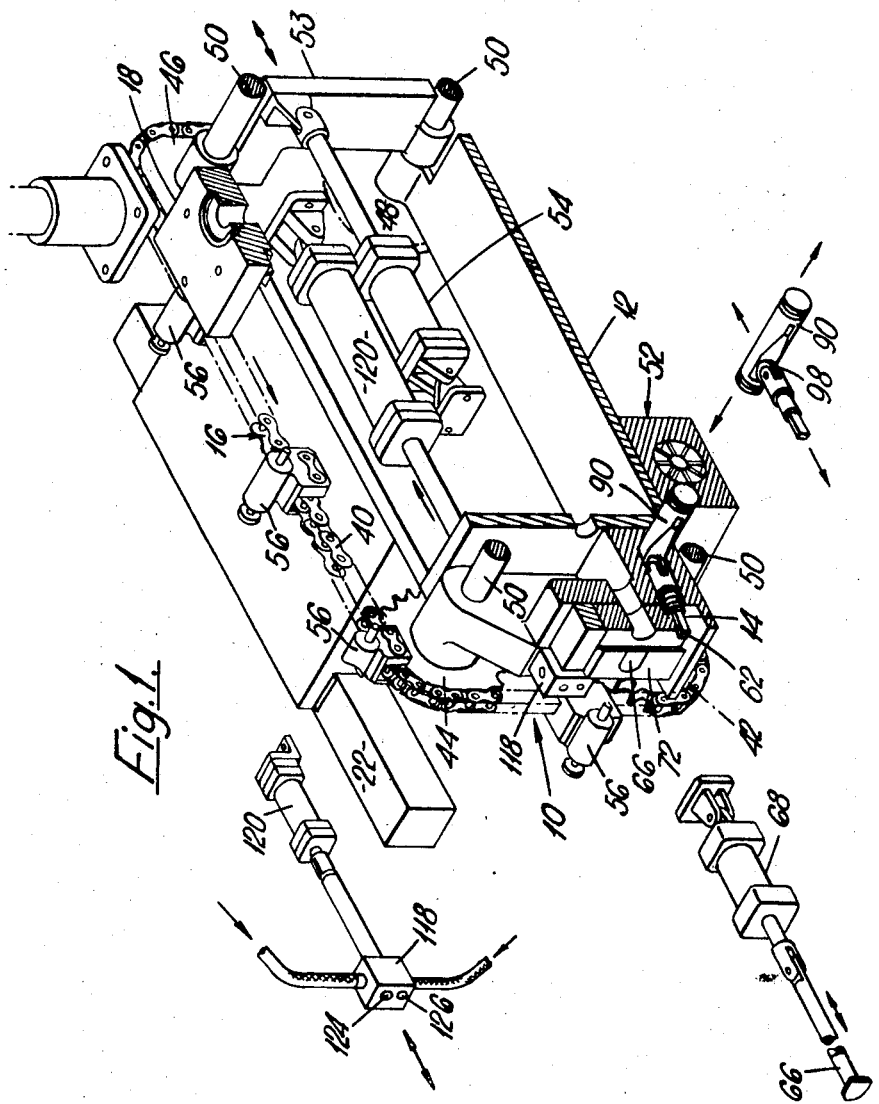
FIG. 1 is an exploded, half-sectional perspective view of an embodiment of a tailstock assembly of a lathe in accordance with the invention.

The toolholders 18 are mounted at spaced intervals on the chains 40 by means of spring-loaded plungers 56 which are carried permanently on the chains and engage in holes in the toolholders 10 (see FIGS. 1 and 5). As a safeguard to prevent the holders 18 from the becoming detached from the chains inadvertently, the plungers 56 are locked in position by means of setscrews on the holders. A track 58 (see FIG. 5) is provided on the upper side of the body and is arranged to lead the holders into engagement with the tool-receiving station to prevent the holders from becoming caught, jammed or cause undue wear to the tool-receiving station.

In some cases, in particular where longer and heavier tools are to be used it may be necessary to prevent the tool from pivoting about the plungers 56 by for example fitting rollers to the toolholder, which engage an additional track on the side of the holder remote from the body 12 of the tailstock. Such an additional track is of most benefit when it is fitted on the side of the tailstock carrying the tool-receiving station 14.

Once the tool holders 18 are attached to the chain they are driven sequentially into engagement with the tool-receiving station 14 at which they are clamped in a precise, predetermined position in relation to a workpiece in the machine tool.

Before mounting the toolholders 18 on the conveyor they are placed in a mounting similar to the tool-receiving station 14, which has reference surfaces formed on it at known positions in relation to those of the tool-receiving station on the machine tool. The reference surfaces on the receiving station being themselves at a known distance from the centerline of the machine tool. The tool can then be preset in its holder 18 at a place remote from the machine so that when it is engaged in the tool-receiving station 14 the tool assumes the predetermined or preset position relative to the workpiece. Adjustment for height is provided by a setscrew on the holder which engages a retractable stop 62 (FIG. 4) on the tool-receiving station 14; sideways adjustment is taken up on the tool, lengthwise adjustment is by movement of the assembly as a whole preferably as disclosed in copending U.S. Pat. application No. 835,199 filed on June 20, 1969 and assigned to me.

The tool-receiving station 14 comprises a vertical female dovetail member (FIG. 4) having one of its sloping sides 64 accurately positioned on the body 12 to constitute a first reference plane or surface. The other of its sloping sides is interrupted by a retractable clamp 66 which is driven by a pneumatic or hydraulic ram 68 (see FIG. 5). The face 72 of the tool receiving station acts as a second reference plane, and the vertical location of the holder is established by the retractable stop 62.

In order to prevent undue wear on the stop surface 74 and to facilitate retraction of the stop when a toolholder is clamped in position, the axis of the stop is at 5° to the horizontal so that as it is retracted it moves slightly downwards to disengage itself from the holder, and to prevent the stop from being jarred every time a holder is engaged in the dovetail a small air bleed hole 73 is provided in the surface 74 of the stop and is arranged to actuate the clamp 66 when it becomes blocked. When the clamp 66 is operated the motor 52 is stopped.

When a machining operation is complete, the stop 62 is retracted, the clamp 66 is released and the motor 52 drives and advances the conveyor is an anticlockwise direction, as seen in the drawings (FIG. 5), carrying the toolholder downwardly through the receiving stations 14 and advancing the next toolholder in position to be engaged at the tool-receiving station. As soon as one holder 18 has passed the stop 62 the stop is extended and the clamping operation is repeated with the following holder.

Figure 3:
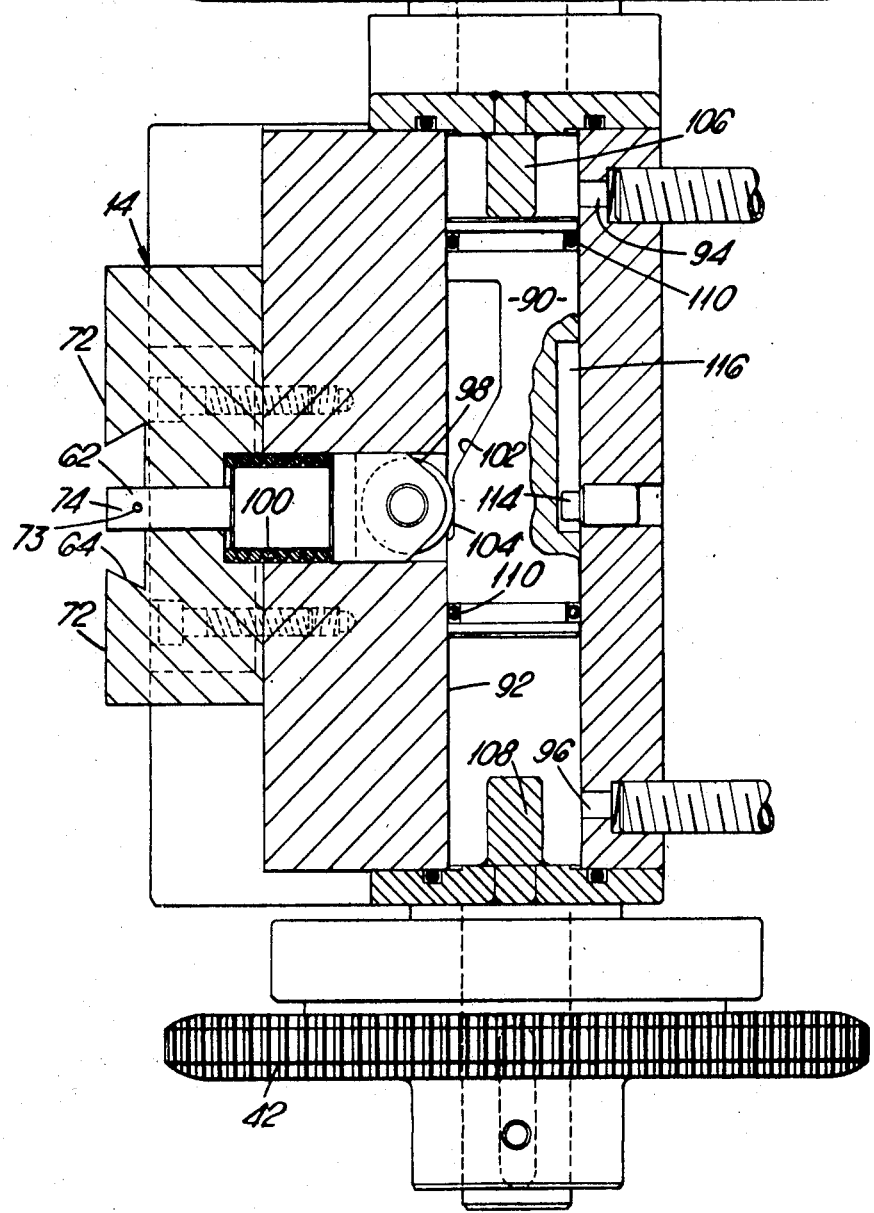
FIG. 3 is an enlarged sectional plan of an end stop operating mechanism taken substantially along vantage line 3–3 of FIG. 4.

Partly because the stop 62 has to be located very accurately, and partly because of a lack of space in the assembly 10 the stop is operated by means of a piston 90 (FIGS. 1 and 3) which can be reciprocated in a cylinder 92 by supplying compressed air to the appropriate side of the piston through lines 94,96. At its inner end, the stop 62 has a roller follower 98 which is biased by means of a spring 100 into engagement with a cam surface 102 formed on the piston. In the position shown in FIG. 3, the stop is in the fully cut position, in which the follower engages a flat portion 104 of the cam to ensure that it assures an absolutely accurate position. The piston itself is accurately located by its engagement of an end stop 106,108. Similarly, a flat portion of the cam is provided at the position in which the cam is fully retracted. Leakage of the air in the chamber at either end of the cylinder past the piston is prevented by resilient O-rings 110 which are held captive in grooves in the piston. The piston is prevented from rotating about its axis by a pin 114 which engages a slot 116 formed in the side of the piston.

In most cutting operations coolant is required to be directed onto the cutting tool and onto the workpiece. In some cases compressed air is also required to operate the tool, for example, to retract it when it has taken a finishing out so that there is no scroll mark left on the workpiece.

A block (not shown) is provided at the side of the toolholder 18 and has connection to which can be attached pipes carrying cutting fluid or coolant and/or air lines to operate the tool in the toolholder. The provision of coolant pipes on the holder enables the coolant direction to be preset at the same time as the tool is preset, at a position remote from the machine tool.

Figure 4:
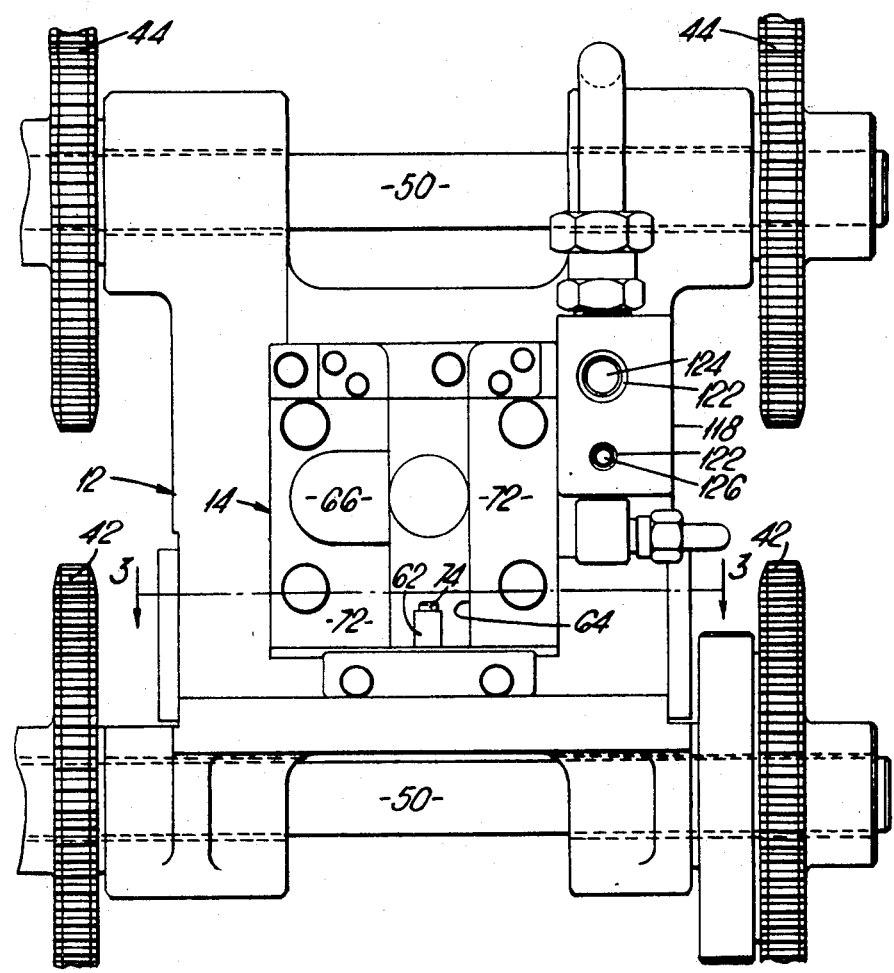
FIG. 4 is an end elevation of a tool receiving station of the tailstock assembly.

When the toolholder 18 is engaged in the tool-receiving station 14 a corresponding coolant and air supply block 118 cooperates with the block on the holder and is urged against it by means of a ram 120 (see FIG. 4). Sealing rings 122 are provided in the face of the block 118 to ensure a leakproof seal. The larger upper port 124 (FIG. 4) is connected to the coolant supply and the lower port 126 to a compressed air supply. Where neither service is required, a block having no outlets is attached to the holder 18. Before the holder is moved away from the tool-receiving station the coolant and compressed air supplies are switched off and the block 118 is retracted by the ram 120.

The use of a tailstock assembly in accordance with the invention allows a machine tool to be provided with a greater number of tools, thus greatly improving its flexibility. This system has been found to be capable of very high accuracies over prolonged periods of time and a great many tool changes. By having only a single tool-receiving station for each machine the changes of errors from one station to another are eliminated and every one of the tools can be preset on a measuring table remote from the machine tool.

Although the tailstock construction is more suitable for use with a new, specially designed machine tool, such as a lathe, it is contemplated that with minor modifications it could be fitted to a conventional machine tool either when new or otherwise.

When the stop drum mechanism forming the subject of the aforesaid copending application Ser. No. 835,199 is employed with the tailstock assembly of this invention, not only the tools and the coolant pipes but also the feeds, speeds and stop positions can be preset remote from the machine tool, thus reducing changeover time of the tooling to an insignificant proportion of the total machining time.

It is contemplated that more than one conveyor may be used on one lathe, one as a tailstock to replace a conventional turret or capstan and the other to replace the conventional cross slides. In cases where it is desired to fit the conveyor to an existing machine tool, the operation can be greatly simplified by turning the conveyor on its side so that the tools are moved in a horizontal plane.

It will be appreciated that the conveyor may be sold as a separate unit for fitting either to an existing machine tool, or one manufactured independently.

I claim:

1. A tailstock assembly for a machine tool comprising, movable carrier means having plural toolholder means mounted at spaced intervals thereon, preset tool means carried by said holder means, a single tool station on the tailstock assembly, in spatially stationary relation to said carrier means for movement of the latter therepast; said carrier means comprising an endless conveyor orbital about said station, and means thereon for detachably coupling a plurality of tool-supporting holders thereto; said station comprising means common to all said holder means for receiving the same one by one; means operable to locate all said holder means fed to said receiving means in a common predetermined position therein, and means operable to lock each thereof in said common position whereat said preset tool means associated therewith are in predetermined position for engaging a workpiece in the machine tool; said carrier means being operable periodically to advance said holder means sequentially to said station and feed the same individually to said receiving means, for work-engaging positioning and operation of the associated tool means thereon, and thereafter to remove each said holder means and its associated tool means from said station, without detaching the same from said carrier means.

2. The combination of claim 1, and means for arresting said carrier means whenever a said holder means is locked in said position.

3. The combination of claim 1, in which said means locating each toolholder means comprises retractable stop means for arresting the same in said predetermined position.

4. The combination of claim 3 in which said stop means comprises sensing means for sensing the proximity of a toolholder means advancing theretoward and operable to actuate said locking means whereby to reduce impact of said toolholder means against said stop means.

5. The combination of claim 1 wherein said endless conveyor comprises a pair of parallel spaced endless chains, movable in unidirectional orbit past said station, and said means thereon comprises cooperating fasteners mounted at intervals along the length of said chains for detachably locking toolholder means thereto.

6. The combination of claim 1, wherein said receiving means comprises a dovetail member having an elongated axis paralleling the direction of travel of said carrier means.

7. The combination of claim 6, wherein each said toolholder means mounted on said carrier means is provided with a cooperating dovetail means for mating engagement with said dovetail member at said station.

8. An assembly as set out in claim 1, and two elongated supports movably supporting the assembly on a machine tool, one of said supports being of circular cross section, and the other thereof being of polygonal cross section.

9. The combination of claim 8, in which the centerline of a workpiece in the machine tool and the center lines of said elongated supports are coplanar.

10. The combination of claim 9, and means for selectively advancing and withdrawing the assembly toward and away from the workpiece in the machine tool.